United States Patent [19]

Comerford et al.

[11] Patent Number: 5,243,149
[45] Date of Patent: Sep. 7, 1993

[54] METHOD AND APPARATUS FOR IMPROVING THE PAPER INTERFACE TO COMPUTING SYSTEMS

[75] Inventors: Liam D. Comerford, Carmel; Hamed A. Ellozy, Bedford Hills; Frederick Jelinek, Briarcliff Manor; Stephen E. Levy, Valhalla; David Nahamoo, White Plains, all of N.Y.

[73] Assignee: International Business Machines Corp., Armonk, N.Y.

[21] Appl. No.: 866,681

[22] Filed: Apr. 10, 1992

[51] Int. Cl.$^5$ .............................................. G08C 21/00
[52] U.S. Cl. ...................................................... 178/18
[58] Field of Search .................... 178/18, 19, 20

[56] References Cited

U.S. PATENT DOCUMENTS

| | | | |
|---|---|---|---|
| 4,562,304 | 12/1985 | Ward | 178/18 |
| 4,581,761 | 4/1986 | Ichinokawa | 382/13 |
| 4,638,118 | 1/1987 | Wang | 178/18 |
| 4,656,317 | 4/1987 | Tsugei | 178/18 |
| 4,697,244 | 9/1987 | Murakami | 364/520 |
| 4,745,491 | 5/1988 | Kishi et al. | 178/18 |
| 4,807,143 | 2/1989 | Matsuura | 364/468 |
| 4,849,911 | 7/1989 | Campian | 364/521 |
| 4,857,715 | 8/1989 | Koch | 235/456 |
| 5,001,330 | 3/1991 | Koch | 235/436 |
| 5,023,438 | 6/1991 | Wakatsuki | 235/472 |
| 5,026,953 | 6/1991 | Hsu | 178/19 |
| 5,051,779 | 9/1991 | Hikawa | 355/200 |
| 5,065,003 | 12/1991 | Wakatsuki | 235/472 |

FOREIGN PATENT DOCUMENTS

0411698A2 2/1991 European Pat. Off. .

OTHER PUBLICATIONS

Anon, "ScriptWriter II", *Data Entry Systems*.
Anon, "Method for Creating Annotation Data", *IBM Technical Disclosure Bulletin*, vol. 28, No. 4, Sep. 1985, pp. 1623–1628.

*Primary Examiner*—Stafford Schreyer
*Attorney, Agent, or Firm*—Pollock, Vande Sande & Priddy

[57] ABSTRACT

The novel notepad of the invention provides a convenient interface into the capabilities of computer technology from paper based information. The notepad has a form factor similar to a clipboard wherein the board portion includes a digitizing tablet and the clip portion includes an optical scanner. A battery-powered embedded processor and associated peripherals provide for capturing and storing information in a variety of forms including at least scanning information, digitized stylus information and audio annotation. An important feature of the invention is the linking of these different forms of information via software so that while the information is readily available for efficient processing, it is also combinable so as to recreate the annotated document through conventional means.

39 Claims, 8 Drawing Sheets

METHOD AND APPARATUS FOR IMPROVING THE PAPER INTERFACE TO COMPUTING SYSTEMS

DESCRIPTION

1. Technical Field

The present invention relates to a novel input device for capturing, preserving and correlating information in a variety of formats, including at least image (text and/or graphics), handwritten information and audio information.

2. Background Art

Notwithstanding the advances which have been made in computer technology in the areas of recording and processing of data, paper use has not been reduced. Paper continues to provide the highest resolution, most portable, most available, most easily used in cooperative efforts and most easily manipulated information display system. However, outside of well-equipped offices, paper is not part of the I/O path of computing systems. This fact is directly responsible for the common experience of accumulating documents from meetings, mail, paper-based creative and planning work, and other paper intensive activities. While it is obvious that a large portion of this paper accumulation may have been printed by computer systems, it is also true that a paper document is a more usable form of information representation than the display of a computer file on a computer screen. It is common for work (such as revisions, additions, document creation and annotations) which is performed on paper using handwriting to be transcribed into computer files by laborious effort at work stations. Similar laborious effort is required when documents are created by dictation.

The prior art evidences a variety of information input interfaces including facsimile or scanning input devices, digitizing tablets to capture handwritten information, audio input devices to capture audible information, and keyboards to input coded information. The variety of these devices do not assist in overcoming the problems which have been evidenced in the prior art since each is intended to interface with only a single form of information. While facsimile or scanner devices can capture both printed or typed text as well as handwriting, the file that is produced as a result of such input is limited substantially to preserving and reproducing the input information. While the prior art includes techniques for extracting information from images of typed text, such as OCR methods as well as methods of extracting information from handwritten information (handwriting recognition systems) neither is effective on an image which includes both printed text as well as handwritten information.

SUMMARY OF THE INVENTION

Accordingly, the invention is directed at the problem of the paper/computer work flow bottleneck through the introduction of a new tool. The tool is intended to allow a person to continue using paper in the traditional way while at the same time providing for capturing information for efficient computer manipulation. As a consequence, the user equipped with the invention will have the means for casual and unstructured use of paper combined with the means for providing corresponding computer data which can be efficiently processed.

As described herein, the tool which has been referred to for enabling the use of paper as an off-line medium for computer interaction includes both hardware and software components. The hardware components include a stylus digitizer (sometimes referred to as a tablet) and a scanner. These input elements are combined with an embedded processor in order to format the output from the scanner and digitizer into data files on a non-volatile medium or the dump those files to other systems through a convenient conventional port. Preferably, the tool also handles analog speech recording. For control purposes, the tool includes a small character-oriented display and control panel. The panel allows the user to inform the device that a previously-scanned page has been remounted so that data from the previous scanning operation and a subsequent event or events can be correctly combined. The subsequent event or events can be either or both of audio annotation and/or handwritten annotation. The display allows a path to conduct page number and status information to be provided to the user. Local segments of the digitized information can also be displayed. When speech annotation has been captured, the tool can provide feedback to the user showing an icon representing capture of audio information. Finally, in some environments such as on long trips, an auxiliary display can be used to review file contents.

In accordance with one aspect of the invention, these components are combined in a portable package with a form factor similar to that of a clipboard. The clip portion of the clipboard is detachable and is formed for use as a hand-held scanner. The board portion of the clipboard contains a stylus digitizer. The hand-held scanner is arranged to mechanically interface with the stylus digitizer via spring-loaded toggles which engage tracks on the digitizer either on the bottom or at the edges of the board. With this mechanical interface, when a piece of paper is supported by the digitizer, the scanner can be run across the page guided by the tracks so that an image of the page is captured by the scanner. As the scanner reaches one end of the digitizer, it is locked into a final position at the top of the board where it locks the paper to the digitizer. The paper is now said to be "mounted" in the same sense as a disk or tape file may be mounted. The image of the paper taken in the act of clipping it to the board is then available for future upload to a more complete information processing system. Similarly, any annotations made with the digitizer are saved in the clipboard memory and associated with the scan image. Preferably, the digital information which is captured by the clipboard (either the scanner or the digitizer) can be compressed to conserve storage.

It should be apparent from the foregoing that the user of such a tool has a paper quality presentation medium (the piece of paper itself) available for any document used in any circumstance. Further, having collected the data which contains both the image of the paper as well as any annotations made to the paper or associated with the paper (audio annotation), retention of the paper itself becomes optional. On return to an office environment, the recorded data can be dumped to an office system for storage, redisplay, recreation through printing or for reduction to coded form through a combination of recognition software techniques, e.g. optical character recognition for printed or typed text, handwriting recognition for written annotations and speech recognition for speech annotation.

Capturing information in this form has implications which impact on the workstation system software. It is of value to maintain synchronization or registration between the contents of the recorded data and the computer file system. This is accomplished by means of a bar code document/file identification system. Bar codes on printed documents can be read by the scanner at the time the document is mounted. User-changeable fields in the bar code or other parts of the document header can be used to differentiate succeeding versions of a given document. By storing a document in a root-plus-changes format, any point in the document development history remains available. Similarly, new versions of a document may be created either by conventional editing of coded information or by NCI editing of the document images.

Potential Use

Note-taking is pervasive and natural in human activity. The tool described by this application can facilitate work everywhere that paper is presently used as a medium of choice in personal and interpersonal activity. Consider for example annotating and adding significant amounts of text to an existing document. Assume that the existing document has been printed from a computer file and the computer has added a bar code to the page header in order to support document tracking. Assume that the document is distributed to attendees of a class or meeting, where the attendees do not have an available computing system. Work begins on the document by mounting it on the digitizer.

As described, the document is scanned as it is mounted. When the scanner reaches the top of the page, locking the paper to the board, the printed bar code is under the scanner. The bar code is scanned in and the data encoded in it is used to prepare a file header for the data reflecting that page. As the user makes annotations or adds text in handwriting, the digitizer generates data describing the stylus motion; that data is gathered and stored with a link to the scanned image. The stylus operations can include handwriting, gestures and graphics. The data added as a consequence of operation of the digitizer is of the kind needed by handwriting recognition algorithms. Preferably, the tool is also equipped with speech annotation apparatus allowing the user to point to or scribe gestures on the text. Timing information is stored along with both the digitized stroke and speech so that these data extremes can be correlated at a later time. On completion of operations on the first page, the next page can be mounted. As the page is demounted, it may be rescanned to provide data to support correlating the digitized writing with the printed text and to compensate for possible movement of the paper.

On return to an office environment, the work stored in the tool can be uploaded to a workstation. Because the proper forms of data had been stored in each of the interaction modalities, recognition techniques can be applied to the stored information to obtain coded forms of the document, including the voice- and stylus-entered additions. Since the uploaded file contains bar code information which was read from the pre-annotation page, the uploaded data can be correctly combined with the pre-existing computer file. Further, the digital representations of non-coded information can be saved or displayed or printed. The tool described herein has several advantages over "notebook" and "notepad" computers. These advantages arise from the fact that no weight is wasted on the display since the document itself is a display and no computation is included for conversion of the input into coded form. A much more powerful set of recognition tools can be applied at a later date at a workstation if the image of the document is not sufficient to the user's purposes. A system such as has been described is far less expensive than a notebook or notepad computer and a complete paper record of work performed on the system can be maintained.

Accordingly, in one aspect the invention provides an electronic clipboard comprising:

a base unit with two substantially parallel major surfaces, a digitizing tablet supported by the base unit producing a digital stream representing a time sequence of stylus positions, a scanner detachably supported by the base unit, optical scanning means supported by the scanner for producing a scan signal representing optical scanning of a surface of an object, and a processor coupled to the digitizing tablet and the optical scanning means, said processor responsive to the digital stream from the digitizing tablet for storing a representation of the digital stream, said processor responsive to the scan signal from the optical scanning means for storing a representation of the scan signal.

In accordance with another aspect, the invention provides a method of annotating an electronic representation of a document comprising the steps of:

scanning the document to be annotated, creating and storing a scan file representing the scanned document, annotating the document with a marking implement used as a digitizing tablet stylus, creating a tablet file from signals generated by the digitizing tablet during the annotation, storing the tablet file, and generating a link between the scan file and the tablet file and storing the link along with the files.

BRIEF DESCRIPTION OF THE DRAWINGS

The invention will now be described in the following portions of the application so as to enable those skilled in the art to make and use the same when reviewed in light of the attached drawings wherein.

DETAILED DESCRIPTION OF PREFERRED EMBODIMENTS

Figure 1:
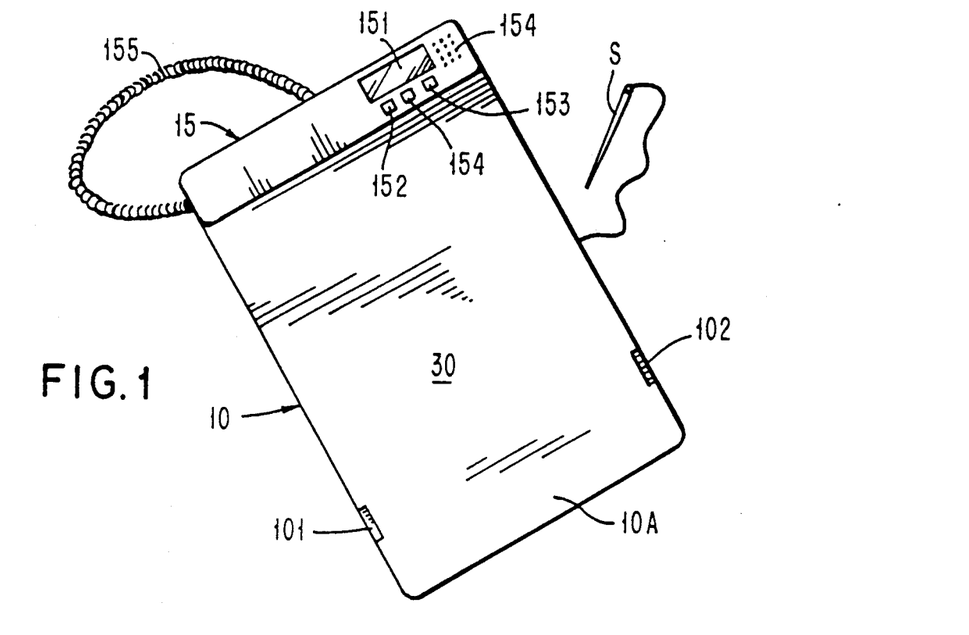
FIGS. 1 and 2 comprise top views of the tool described herein with the scanner locked in place and freed from the base, respectively.
Figure 2:
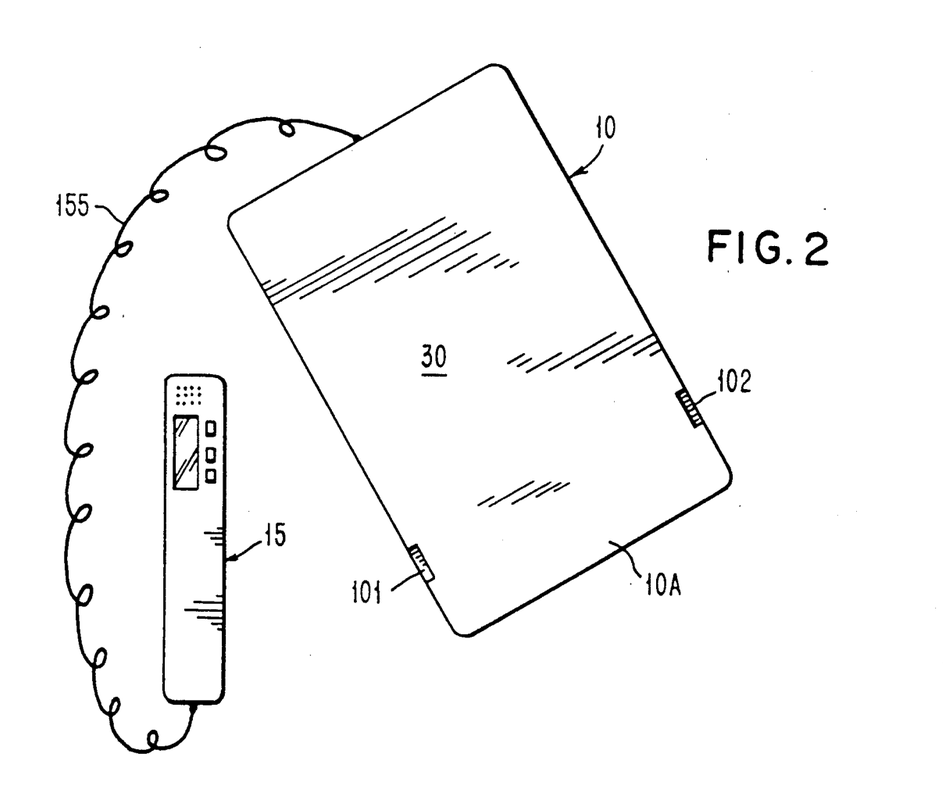
Figure 3:
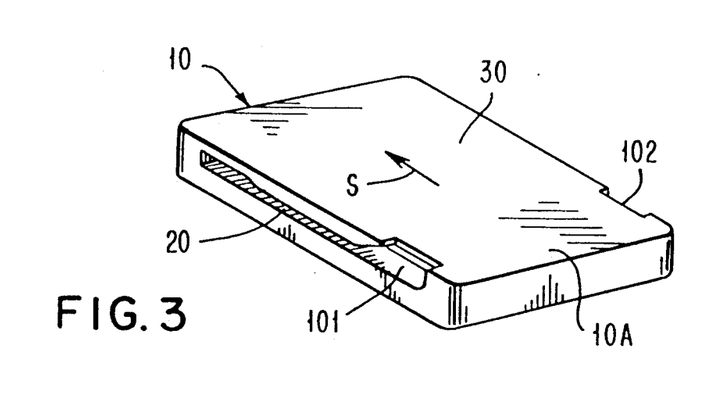
FIG. 3 is an isometric view of the digitizing tablets showing one form of the scanner guides.
Figure 4:
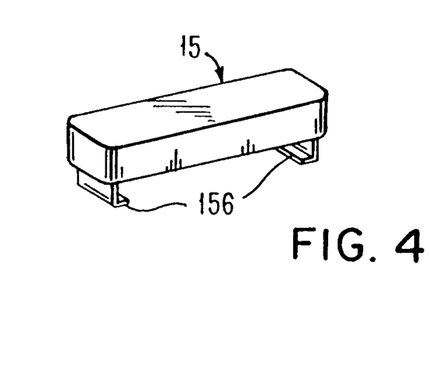
FIG. 4 is an isometric view of the scanner showing the toggles which interact with the guides.

FIGS. 1 and 2 are a top view of the tool or electronic clipboard of the present invention. Two major components, as seen in FIGS. 1 and 2 comprise the digitizing tablet 10 and the scanner 15. FIG. 1 shows the scanner 15 locked in its final position, as will be described, and FIG. 2 illustrates that the scanner 15 is removable for scanning the surface of objects which need not be supported on the digitizing tablet 10. FIG. 3 is an isometric view of the digitizing tablet 10 and shows the major supporting surface 30. The digitizing tablet 10 includes another major surface, parallel to the paper supporting surface 30 which is not illustrated. The digitizing tablet 10 also includes a slot 20 and clip engaging notches 101 and 102, respectively. FIG. 4, a three-dimensional view of the scanner 15, shows the clips 156 which are guided in the slots 20 in use.

Figure 5:
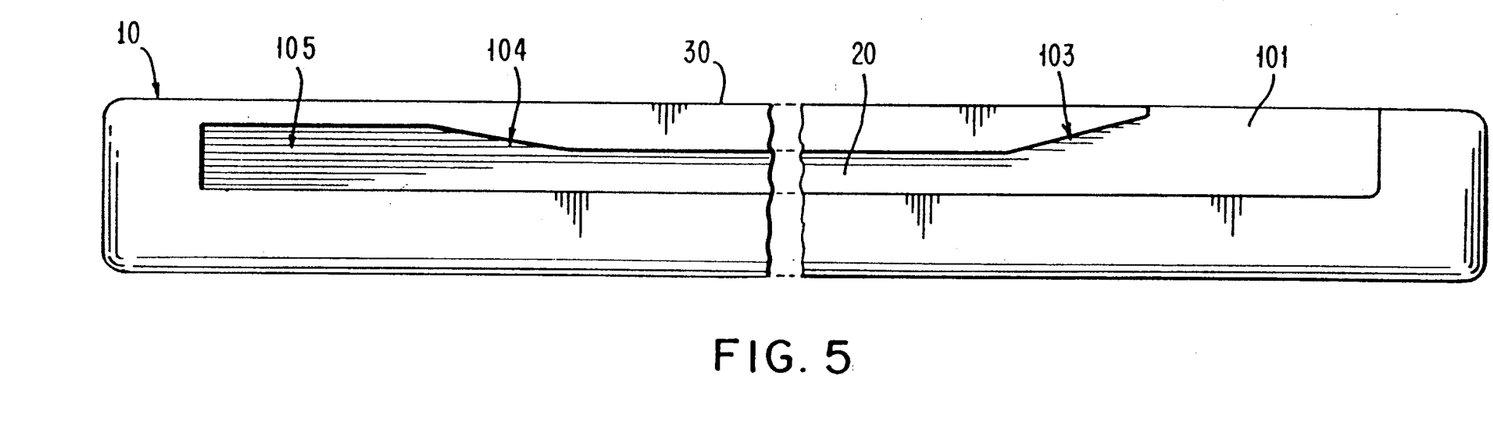
FIG. 5 is an edge view of the digitizing tablet illustrating the guides.

FIG. 5 shows the slot 20 in detail illustrating its major components. These include the notch 101 leading to a leading ramp area 103. As will be described, when the clip 156 engages the ramp 103, a spring is compressed to firmly hold the scanner to the paper supporting surface 30. As the clips 156 ride through the slot 20, near the terminal portion of the travel, a down ramp 104 portion is reached and finally the clips 156 reach the fixed position region 105.

Figure 6:
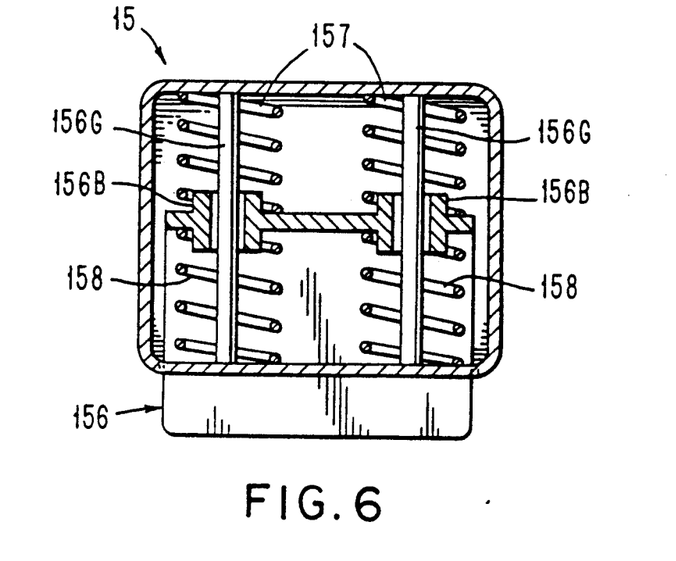
FIGS. 6 and 7 are section views of the scanner illustrating the scanner guide elements.
Figure 7:
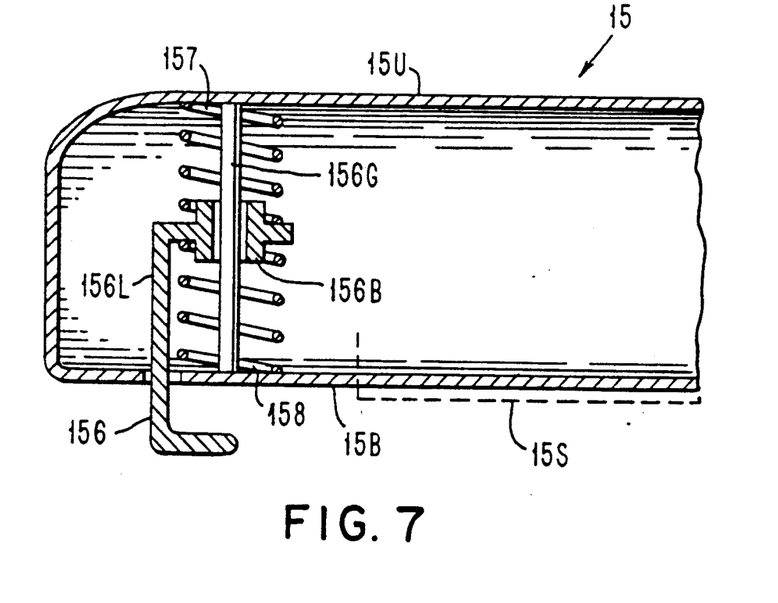

FIGS. 6 and 7 are cross-sections of the scanner 15 illustrating the manner in which the clips 156 are supported by the scanner 15.

As seen in FIGS. 6 and 7, the scanner 15 includes an upper surface 15U and a lower surface 15B. A guidebar 156G is supported between the surfaces 15U and 15B. A bushing 156B is arranged to ride along the guidebar 156G under the opposing forces of a return spring 157 and a clamp spring 158. The bushing 156B carries an extension 156L which is formed into a clip 156 below the surface 15B. The clip 156 can be inserted into the slot 20 of the digitizing tablet 10 through the notches 101 and 102, respectively. With the scanner supported in the region of the lower portion 10A of the digitizing tablet 10, the clips 156 can be engaged in the notches 101, 102. Thereafter, as the scanner 15 is moved in the direction of the arrow S, the surface of the clips 156 initially engage the up ramp 103. The motion of the clips 156 compresses the clamp spring 158 in order to secure any paper on the surface 30 firmly in position. The clamp spring 158 is maintained in this condition as the clips 156 ride along the slot 20. As the clips 156 reach the down ramp region 104, the return spring 157 acts to move the clip 156 and its extension 156L vertically upward until the clip 156 reaches the clip position 105 where it maintains any paper on the paper supporting area 30 firmly in position. Similarly, the scanner can be drawn across books or documents too thick for mounting, in which case the toggles are caused to retract by pressure from the scanned surface compressing springs 157.

The scanner 15 includes an optical scanning element 15S which is shown in dotted outline in FIG. 7. The scanning element 15S includes a light source and optical detector arrangement to create the scanned signals. The scanning element 15S is commercially available and one device which can be used is the Kyocera Amorphasilicon Full Contact Line Image Sensor Model KICB-216-8A-STD1. During the motion of the scanner 15 in the direction S, the optical scanner element 15S, supported in the scanner 15, generates signals representing any image of the paper 30. As will be described, the signals generated by the optical scanner are used to create a scan file which is recorded and maintained.

Figure 8:
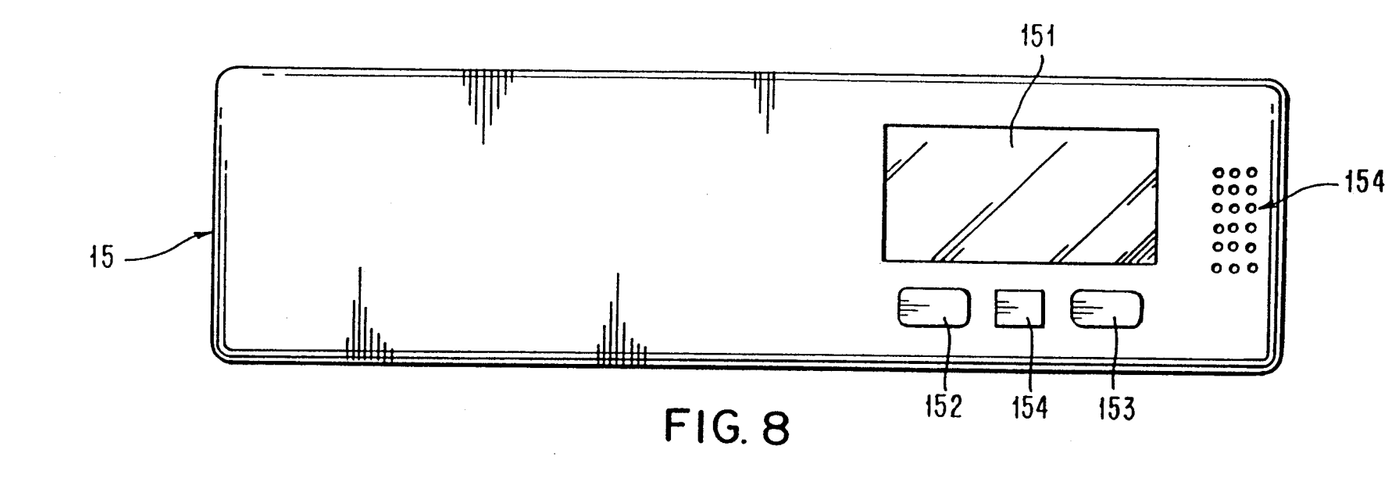
FIG. 8 is an enlarged top view of the scanner showing the display and control keys and audio input location.

FIG. 8 is a detail of the upper surface of the scanner 15 illustrating its major components. These components include a LCD display 151, control pushbuttons 152-154 and below the region 154 a microphone.

Figure 9:
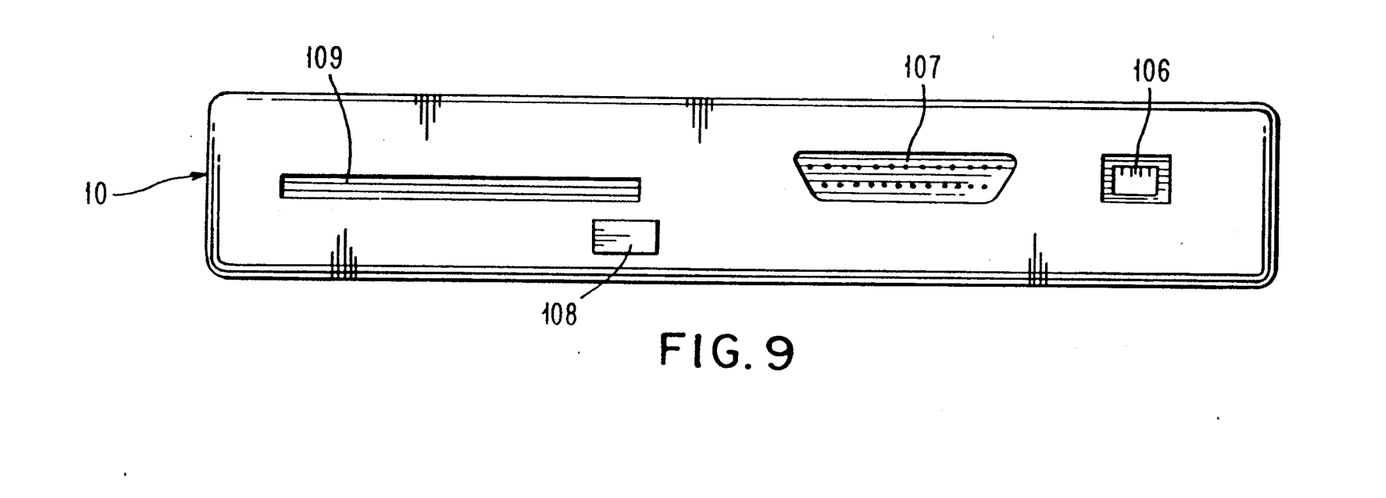
FIG. 9 is an end view of the digitizing tablet illustrating interface hardware including a floppy drive slot, an RS232 port and an RJ11 jack.

FIG. 9 illustrates an edge of the digitizing tablet 10 which illustrates a floppy disk slot 109 and a floppy disk release 108, an RS232 port 107 and an RJ11 jack 106.

Figure 10:
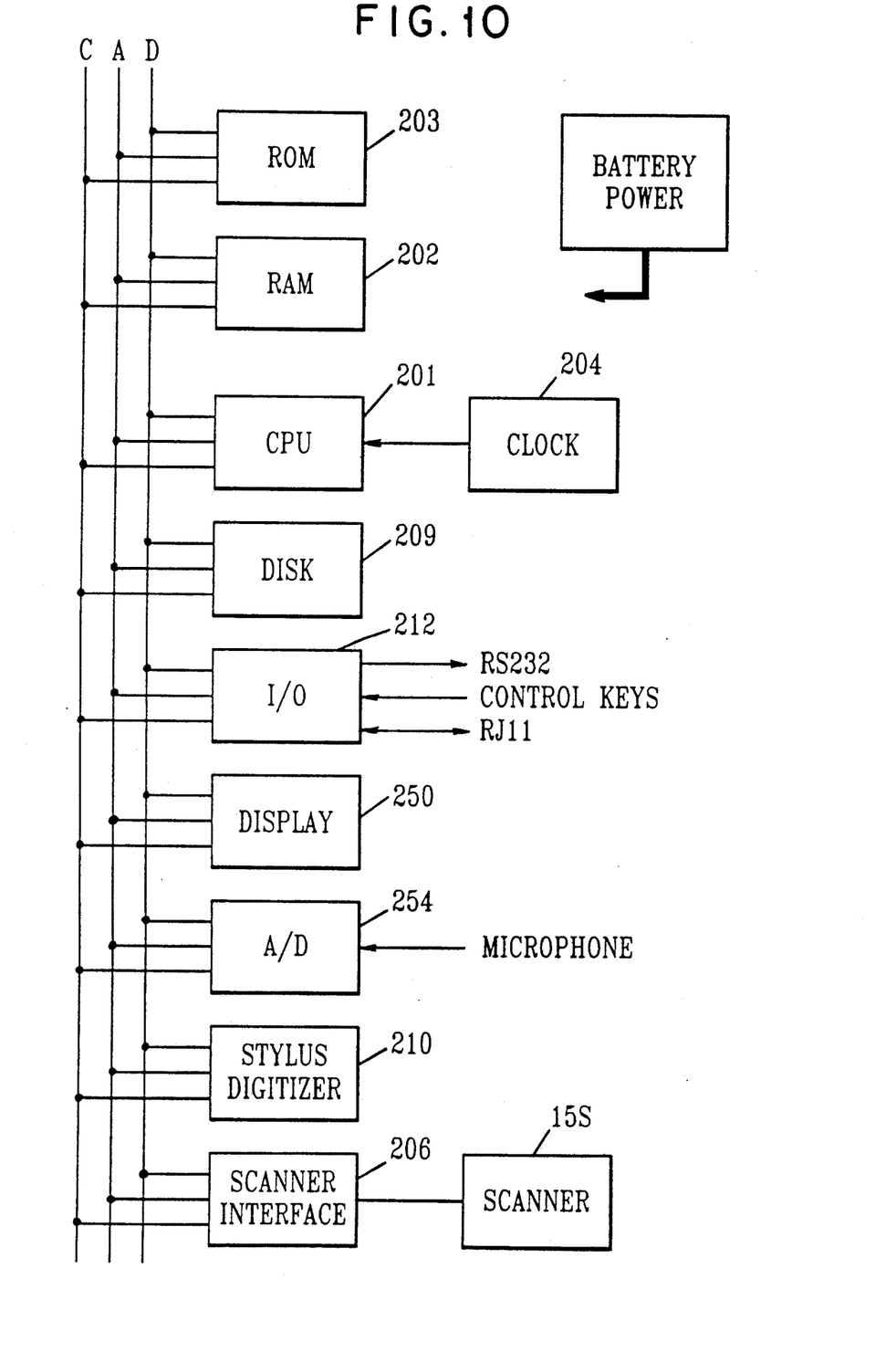
FIG. 10 is an electrical block diagram of the components of the tool described herein.

FIG. 10 is a block diagram of the components internal to the tablet 10. These components include a bus including control lines C, address lines A and data lines D. The bus interconnects the electronic components, including CPU 201, RAM 202, ROM 203, disk drive 209, I/O port 212, display 250, analog to digital converter 254, a stylus digitizer 210, scanner interface 206 and scanner element 15S. FIG. 10 also illustrates that these components are powered by an internal battery, making the clipboard of the invention portable.

Inasmuch as each of the several components shown in FIG. 10 is entirely conventional, a detailed discussion of their construction an operation is superfluous. It is important to note, however, that the I/O device 212 provides for input from the operator via the control keys 152-154 (and it should be apparent that more than three control keys could be employed), allows for the bidirectional flow of data via the RJ11 jack and allows output of data through the RS232 port.

Although there are many ways in which the device within the spirit and scope of the invention can be employed, an exemplary operation scheme will be described. The device may be powered or unpowered by sequentially depressing all three buttons 152-154 simultaneously. On power up, the display will create a top level menu. Two of the control keys, 152, 153, can be used for manipulating a cursor either up or down, respectively. Selection of the item which is highlighted by the cursor can be implemented by depressing the third pushbutton, 154. By using a hierarchy of menus, as is entirely conventional, entirely adequate control can be achieved with only the three control keys 152-154.

Operation of the scanner may be initiated in one of two fashions depending on whether the object surface being scanned is or is not supported on the tablet. In the case where the object being scanned is supported on the tablet, scanner operation is initiated when the clips engage the notches 101, 102. Sensing engagement in the notches by the clips can be achieved in a variety of entirely conventional fashions, one of which is a simple mechanical switch. In the event the scanner is used to scan the surface of an object not supported on the tablet surface 30, then retraction of the clips 156 can be sensed to initiate operation of the scanning element 15S. As an alternative, the user can manipulate a pair of the control keys 152-154 in order to initiate operation of the scanning element 15S. So long as the clipboard is powered on, the tablet can be initiated into operation merely by appropriate manipulation of the stylus S. As is conventional, the stylus S includes electrical components which interact with other electrical components contained in the digitizing tablet 10 so that the digitizing tablet 10 can produce signals representing the position, relative to the tablet 10, of the stylus S. Preferably, however, the stylus S also includes a conventional pen or pencil marking implement in order to provide rapid visual feedback to the user respecting the path over which the stylus S has travelled.

In typical use, a document is first scanned and thereafter annotated either with a digitizer or with audio information. Consequently, unless otherwise commanded by the user, annotation files (created by the digitizer or the use of the microphone) will be linked to the most recently scanned document file. When a document is scanned, signals representing an image of the surface of the document are captured and a file is created wherein those signals are stored in an entirely conventional fashion. However, in addition a control file is created which serves as a link to any subsequent annotations. The user may, however, indicate to the system that a document other than the most recently scanned document is to be annotated. When a digitizer or audio annotation file is created, entries are made to the appropriate control file in order to provide a link between a scanned file and the annotation file or files. It should be apparent that other conventional techniques of linking information from an optical scanner, the digitizer tablet and audio input information can also be employed in lieu of the linking arrangement just described. For example, rather than creating separate files for the scanned information, the digitized information and the audio annotation information, a single file can be created in which scanned information is found in one segment of the file, any digitized information is found in a separate segment and any audio annotation is found in a still different segment.

Figure 11:
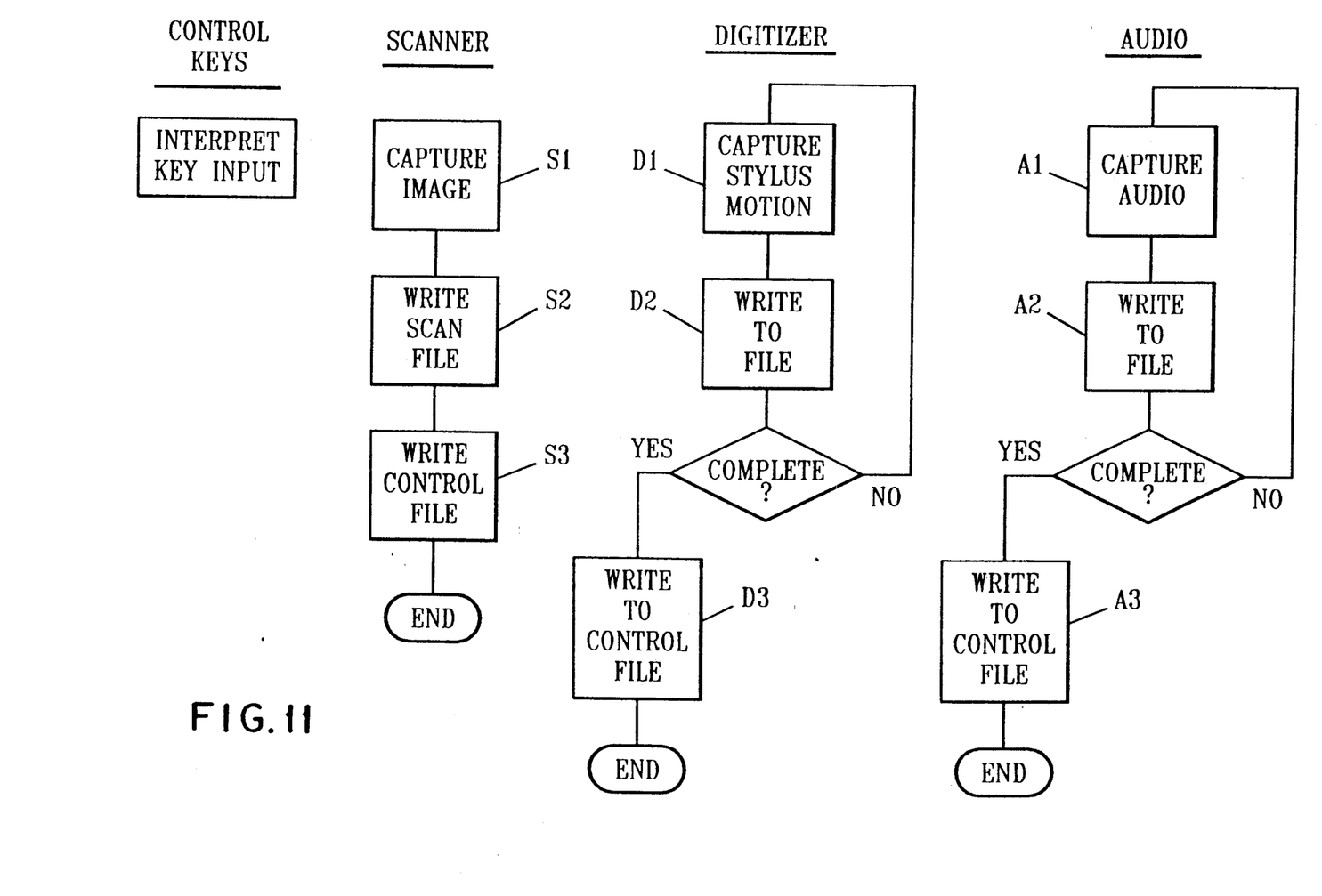
FIG. 11 illustrates the major software functions made available by the tool.

FIG. 11 illustrates some of the software provided for supporting the functions just described.

More particularly, detection of operator manipulation of a key or keys invokes a routine to interpret the key input. As has been described, that control operation can power the notepad, depower it, select an active file, direct the output of one or more files, erase one or more files, etc.

When the scanner operation is initiated, the functions shown in FIG. 11 immediately below the heading "scanner" are implemented. More particularly, function F1 captures the image from the scanner. Function F2 writes the captured data to a file which is or has been created for that purpose. Preferably, the writing function includes compressing the data in a conventional fashion. On completion of scanning, function F3 is performed to write the appropriate control file. Completion of scanning can be determined in one of two fashions. If the object surface being scanned is supported on the tablet surface 30, then when the scanner reaches the rest position 105, completion of the scan operation is detected. On the other hand, if the object surface being scanned is not supported on the tablet surface 30, then the termination of scanning can be signalled by the movement of the clips 156 away from the bottom surface 15B of the scanner 15 as it is lifted from the surface of the object that has been scanned by the user.

When signals are detected from the digitizer, function D1 is performed to capture the stylus motion in a manner which is conventional. At an appropriate point, function D2 is performed to write the signals that have been captured to a file which is or has been created for that purpose. When digitizing operation is complete, function D3 is performed to write to the control file to provide the link between the scanned file and a tablet file. Completion of digitizing can be detected either by a positive signal from the user via the control key or keys, or a suitable time-out or by demounting the document.

Capturing audio annotations can be initiated either through a positive signal by the user operation of one or more control keys or with a voice operated switch. In either event, function A1 is performed to capture the audio, i.e. convert it to digital form and store it. Function A2 writes the digitized representations of the audio, and appropriate timing information, to a file which is or has been created for that purpose. On completion of audio annotation, function A3 is performed which writes an appropriate link to the control file. Completion of audio annotation can be signalled either positively by the user manipulation of one or more control keys or through a suitable time-out.

Figure 12:
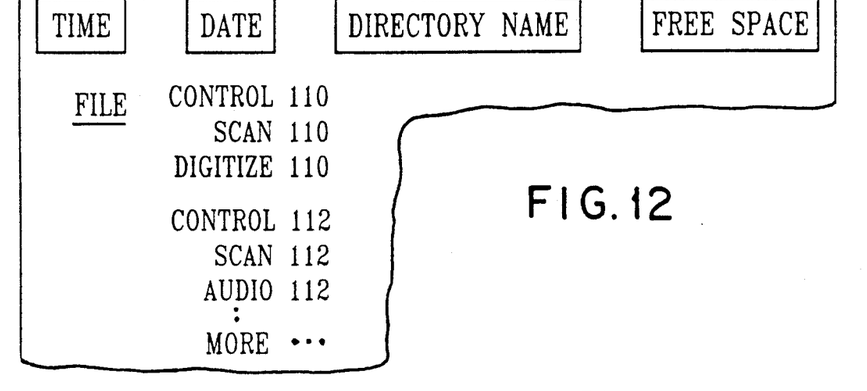
FIG. 12 is a exemplary file display.

FIG. 12 is an example of a typical display illustrating the file format created by operation of the invention and stored on a floppy diskette. As shown in FIG. 12, six files are represented. A first document, identified as 110 is associated with a control file, a scanned file and a digitized file. A second document, identified as 112, is associated with a control file, a scanned file and an audio annotation file. Of course, as has been explained, the control file associated with document 110 had at least one entry identifying the associated digitizer file. The control file 110 may, but need not, have an explicit entry identifying the scanned file inasmuch as the presence of a scan file may be implicit.

Figure 13A:
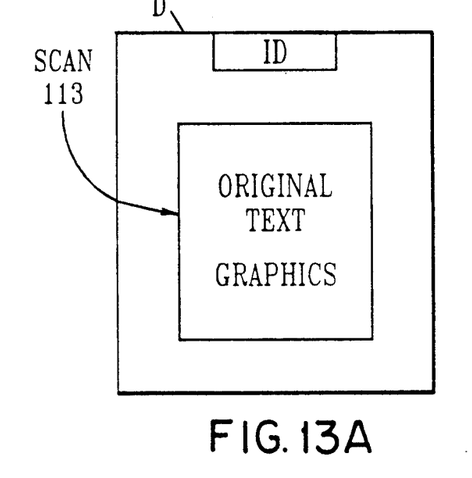
FIGS. 13A/13B and 14A/14B illustrate two examples of documents pre- and post-annotation which are useful in explaining the operation of the invention.
Figure 13B:
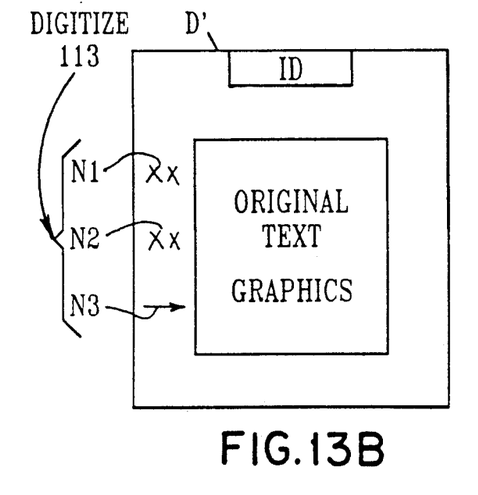

FIGS. 13A and 13B illustrate an example of the use of the invention in an application where a document may be handed out and used, as will be described. FIG. 13A shows a document D which carries some original text and/or graphics as well as an ID in the form of a bar code for example. Typically, the user will "mount" the document as has been described. More particularly, the user will lay the document D on the paper supporting surface 30, hold the document with a thumb at 10A and run the scanner 15, with the clips 156 guided by the slot 20, from the position at which the clips 156 engage the notches 101 and 102 up to the position in which the clips 156 engage the rest position 105. The action of the scanner traversing the document generates scan signals in a manner well known to those skilled in the art, and those scan signals are input to the electronics components of the electronic clipboard so that after the scanning operation has been complete, a file SCAN 113 has been created and stored on the disk located in the disk drive 209. The reference SCAN 113 in FIG. 13A illustrates the original text and graphics has now been captured in the file scan 113. Furthermore, using well known techniques, a copy of the document D can be created from the file SCAN 113 in any of a number of ways. For example, the file SCAN 113 can be read and the signals created during the reading process can be coupled through the RJ11 jack to a facsimile machine to recreate a copy of the document D. Alternatively, those same signals can be coupled through an RS232 port to a workstation so that a copy of the document D is created on the CRT screen of the workstation. Other ways of creating a copy of the document D will be apparent to those skilled in the art.

Returning now to the user, who has now mounted the document D on the electronic clipboard, now assume that he adds several handwritten annotations on the document such as the annotations N1-N3 shown in FIG. 13B. The act of creating these annotations, inasmuch as the document D is supported on the digitizing tablet, will create tablet signals from the digitizer 210. The signals will be employed by the CPU 201 to create a file DIGITIZE 113 to be stored on the disk contained in the disk drive 209.

Having created the annotated document D' of FIG. 13B, the user may now discard the document and thereafter recreate a copy of the document D' in any of a number of ways. In addition to recreating a copy of the document D' in a manner which has been set forth with respect to the document D, the user can perform some functions on the files SCAN 113 and DIGITIZE 113 which are novel. For example, after uploading the files SCAN 113 and DIGITIZE 113 to a workstation, the user can extract information from the files SCAN 113 and DIGITIZE 113 by using respectively character recognition analysis on the file SCAN 113 and handwriting recognition software on the file DIGITIZE 113. To the extent that the user's annotations N1–N3 can be analyzed using handwriting recognition, those annotations can be translated into encoded form, just as character recognition can translate the image such as that shown in FIG. 13A into encoded form.

Figure 14A:
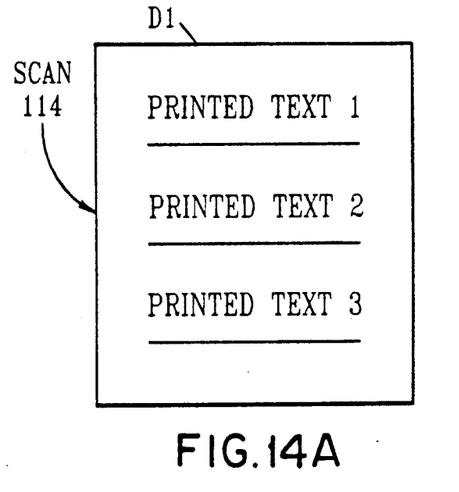
Figure 14B:
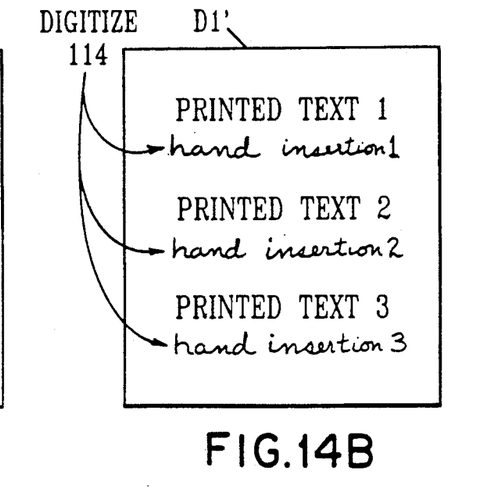

Application of the invention does not require the annotations to be outside of a field containing the original text and graphics such as is illustrated in FIGS. 13A and 13B. FIGS. 14A and 14B illustrate a different document D1 which further illustrates the capabilities of the invention. More particularly, as shown in FIG. 14A, the document D1 includes three lines of printed text, i.e. printed text 1, printed text 2 and printed text 3. In order to demonstrate this application of the invention, we will assume that the user has "mounted" this document in the same fashion that the document D has been mounted such that a file SCAN 114 has been created representing an image of the document D1. FIG. 14B shows the document D1 has now been annotated by the user while it is secured to the digitizing tablet of the invention. More particularly, the user has annotated the document by the handwritten insertions numbered 1–3. As a consequence of the fact that the handwritten annotations were created while the document was supported on the digitizing tablet, the electronic clipboard of the invention has captured the motion of the pen or pencil associated with stylus S used in the annotation and created a file DIGITIZE 114.

Having the files SCAN 114 and DIGITIZE 114 available on the disk, the user can now recreate the document D1' in any of the ways already mentioned. Furthermore, the user can, after transferring the files SCAN 114 and DIGITIZE 114 to a workstation apply character recognition analysis to the file SCAN 114 and handwriting recognition to the file DIGITIZE 114.

Figure 15:
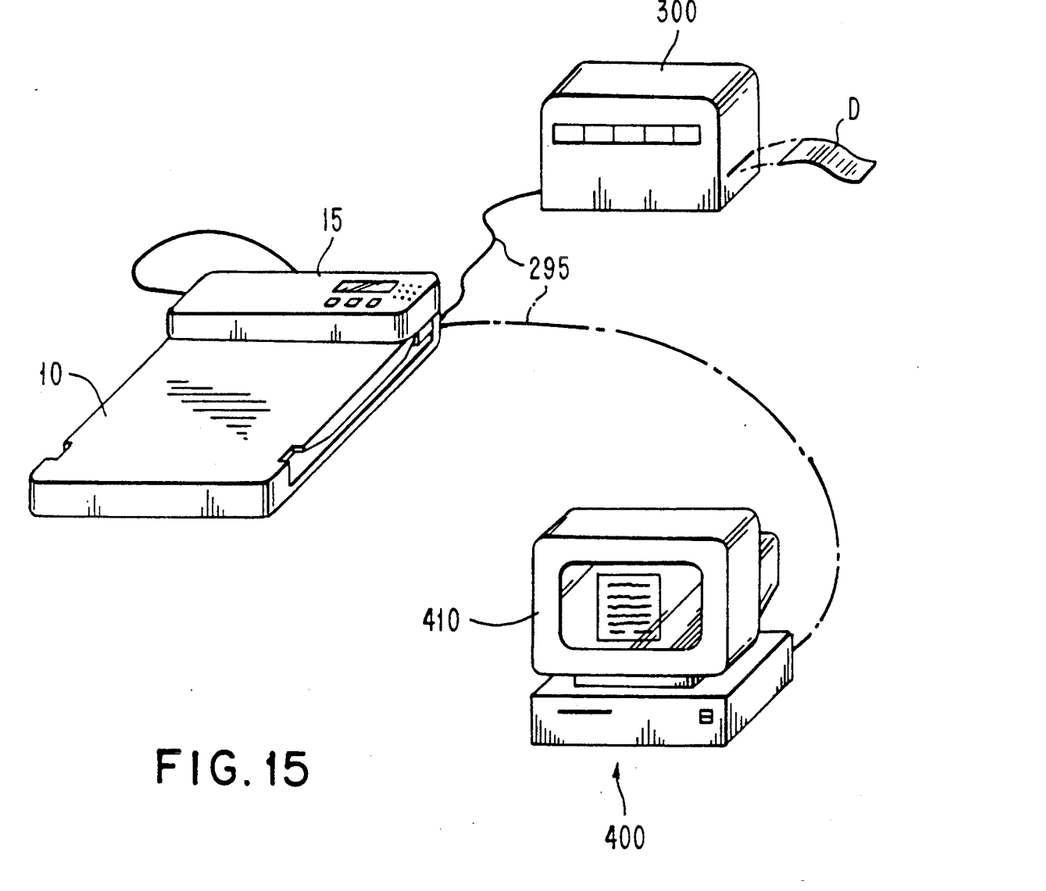
FIG. 15 shows application of the clipboard to further processing on the captured data.

FIG. 15 for example illustrates some of the uses of the data which has been captured by operation of the clipboard just described. FIG. 15 shows for example that the RJ11 port is coupled via a cable 295 to a facsimile machine 300 to recreate a copy of the document D from a scanned file. With appropriate software, the clipboard can merge a scanned file and digitized file so as to recreate a copy of the annotated document D' in lieu of the original document D on the facsimile machine 300. The merge operation is implemented in two steps. In a first step, the scanned file is copied, in a second step, the digitized information is used to mark the portions of the scan image corresponding to the locations at which digitized information is present. As a consequence of the second step, the scan image has been annotated by information contained in the digitized file. When this merged file is output to, for example, a facsimile machine 300, the output of the facsimile machine 300 will be a copy of the annotated document D'.

FIG. 15 also suggests that the cable 295 can be connected to a workstation 400 in lieu of the facsimile machine 300. The cable 295 may be connected to the RS232 port for output in this case. As shown in FIG. 15, the workstation 400 includes a display 410 on which can be recreated either the original document D, from the scanned file, or the annotated document D' by suitably combining the scanned file and the digitized file. It should also be apparent that if desired the workstation 400 can display only the handwritten annotation. Furthermore, the workstation 400 can apply conventional optical character recognition techniques to the scanned file so as to derive a coded version of the information recently contained in the document D. In a similar fashion, the workstation 400 can apply conventional handwriting recognition to the digitized file to obtain a coded version of the handwritten annotations. It is also possible for the workstation 400 to apply voice recognition techniques to an audio annotation file to create a coded version of the audio annotations in a like fashion.

While a particular example of the invention has been described, it should be apparent to those skilled in the art that many variations can be accomplished within the spirit and scope of the invention and accordingly the scope of the invention should not be limited by the particular example described herein, but rather should be construed in accordance with the claims attached hereto.

For example, while the use of a floppy disk has been mentioned, which implies a magnetic storage device, it is also within the scope of the invention that magnetic tape could be employed, demountable semiconductor memory or optical storage techniques. Furthermore, the clipboard may contain a hard disk in lieu of, or in addition to, the floppy disk drive.

What is claimed is:

1. An electronic clipboard comprising:
   a) a base unit with two substantially parallel major surfaces,
   b) digitizing tablet supported by the base unit producing a digital stream representing a time sequence of stylus positions,
   c) a scanner detachably supported by the base unit,
   d) an optical scanning means supported by the scanner for producing a scan signal representing optical scanning of a surface of an object, and
   e) a processor coupled to the digitizing tablet and the optical scanning means, said processor responsive to the digital stream from the digitizing tablet for storing a representation of the digital stream, said processor responsive to the scan signal from the optical scanning means for storing a representation of the scan signal.

2. An electronic clipboard as recited in claim 1 wherein said processor further includes:
   e1) storage media for the storage of representation of said digital stream and said scan signal.

3. An electronic clipboard as recited in claim 2 wherein said storage media is removable.

4. An electronic clipboard as recited in claim 2 wherein said storage media comprises a magnetic disk.

5. An electronic clipboard as recited in claim 2 wherein said storage media comprises a magnetic tape.

6. An electronic clipboard as recited in claim 2 wherein said storage media comprises semiconductor memory.

7. An electronic clipboard as recited in claim 2 wherein said storage media comprises an optical read/write media.

8. An electronic clipboard as recited in claim 1 wherein said processor further includes means responsive to an input signal comprising either said digital stream or said scan signal for creating or modifying a data file to store a representation of the input signal.

9. An electronic clipboard as recited in claim 8 wherein said processor includes an output port and means for generating an output signal representing one of said data files.

10. An electronic clipboard as recited in claim 1 which further includes operator input means coupled to said processor and responsive to operator manipulation for directing operation of said processor.

11. An electronic clipboard as recited in claim 1 wherein said base unit includes said digitizing tablet as one said major surface, said base unit includes first guide elements interacting with second guide elements of said scanner whereby said scanner is guided for motion relative to said base unit.

12. An electronic clipboard as recited in claim 1 which further includes audio annotation means responsive to utterances from an operator for storing representations of said utterances.

13. An electronic clipboard as recited in claim 12 wherein said processor designates a file representing said scan signal as an active file, said processor includes means responsive to receipt of said digital stream to create a file representing said digital stream and a linkage between said active file and said created file.

14. An electronic clipboard as recited in claim 13 wherein said processor further responds to operation of said audio annotation means to create a linkage between said active file and stored representations of said utterances.

15. An electronic clipboard as recited in claim 13 wherein said processor includes default designation means for designating a most recently created scan file as an active file.

16. An electronic clipboard as recited in claim 15 further comprising operator input means coupled to said processor and responsive to operator manipulation for directing operation of said processor, said operator input means responding to operator input to override the default designation and direct said processor to designate a selected file as an active file.

17. An electronic clipboard as recited in claim 1 wherein said digitizing tablet, said optical scanner and said processor are powered by a battery located within said base unit whereby said electronic clipboard is a portable electronic clipboard.

18. A method of annotating an electronic representation of a document comprising the steps of:
a) scanning the document to be annotated, creating and storing a scan file representing the scanned document,
b) annotating the document with a marking implement used as a digitizing tablet stylus,
c) storing tablet data from signals generated by the digitizing tablet during the annotation of step b),
e) generating a link between the scan file created and stored in step a) and the tablet data stored in step c) and storing the link.

19. A method as recited in claim 18 wherein step a) includes:
a1) locating the document to be annotated on a digitizing tablet,
a2) scanning the document supported on the digitizing tablet with a scanner guided by guide elements of the digitizing tablet,
a3) at completion of scanning, locking the document to the tablet by securing the scanner in a lock position on the digitizing tablet, whereby
annotations to the document generate digitized position signals registered with features of the scanned document.

20. A method as recited in claim 18 wherein a storage device maintains plural scan files and wherein said step d) comprises:
d1) selecting as the scan file to be linked to the tablet file an active scan file.

21. A method as recited in claim 20 wherein an active file is defined, by default, as the last file created by scanning a document.

22. A method as recited in claim 21 which includes a step of overriding, in response to operator selection, designation of an active file.

23. A method as recited in claim 18 which includes the further steps of:
e) responding to operator utterances for digitizing and storing signals representing said utterances as an audio file.

24. A method as recited in claim 23 which includes the further steps of:
f) creating a link between the stored utterance representing signals and at least a scan file.

25. A method as recited in claim 24 wherein said stored utterance representing signals are stored in a audio file and wherein said processor creates and stores a separate link file linking said scan file and said audio file.

26. A method as recited in claim 25 wherein said tablet data is stored as a separate tablet file and said link file includes a link to said tablet file.

27. A method as recited in claim 24 wherein said stored utterances are stored as a segment of said scan file.

28. A method as recited in claim 27 wherein said tablet data is stored as a segment of said scan file.

29. A method as recited in claim 26 which includes the further step of outputting at least linked scan and tablet files.

30. A method as recited in claim 18 wherein the scan file has a format suitable for efficient operation of a character recognition process.

31. A method as recited in claim 18 wherein the tablet data is stored in a separate tablet file which has a format suitable for efficient operation of a handwriting recognition process.

32. A method as recited in claim 31 which includes the further step of outputting at least linked scan and tablet files.

33. A method as recited in claim 32 wherein said outputting step includes coupling said linked scan and tablet files to a workstation for producing a single document reflecting both the scanned document as well as the annotations digitized in step b).

34. A method as recited in claim 32 wherein said outputting step includes coupling said linked scan and tablet files to a workstation and which comprises the further step of executing a character recognition process on said scan file to extract information therefrom.

35. A method as recited in claim 34 which comprises the further step of executing a handwriting recognition process on said tablet file to extract information therefrom.

36. A method as recited in claim 18 comprising the further steps of:
   e) providing audible annotation for the document;
   f) capturing and storing a representation of the audio annotation in an audio file; and
   g) creating a link between the audio file and the scan file.

37. A method as recited in claim 36 including the further steps of storing the tablet data in a separate tablet file, creating and storing a link file and coupling the scan file, the tablet file, the audio file and the link file to an output device.

38. A method as recited in claim 37 wherein the output device is a facsimile machine.

39. A method as recited in claim 37 wherein the output device is a workstation.

* * * * *